United States Patent [19]

Inoue et al.

[11] Patent Number: 5,076,383
[45] Date of Patent: Dec. 31, 1991

[54] STEERING DAMPER DEVICE

[75] Inventors: Kazushiro Inoue; Kazuyuki Harada; Kiyotaka Hayashi; Etsumi Handa, all of Saitama, Japan

[73] Assignee: Honda Giken Kogyo Kabushiki Kaisha, Tokyo, Japan

[21] Appl. No.: 367,027

[22] Filed: Jun. 16, 1989

[30] Foreign Application Priority Data

Jun. 17, 1988 [JP] Japan ................................. 63-150622
Jun. 24, 1988 [JP] Japan ............................. 63-83682[U]

[51] Int. Cl.⁵ ............................................. B62D 5/10
[52] U.S. Cl. .................................... 180/150; 180/132; 180/161; 180/162; 280/90
[58] Field of Search ................ 180/132, 150, 153, 154, 180/159, 160, 161, 162; 280/89, 90, 693

[56] References Cited

U.S. PATENT DOCUMENTS

| 3,926,070 | 12/1975 | Busso | 280/90 X |
| 4,391,342 | 7/1983 | Nishikawa et al. | 280/89 X |
| 4,558,878 | 12/1985 | Montrenec | 280/90 X |
| 4,588,198 | 5/1986 | Kanazawa et al. | 280/90 |
| 4,736,962 | 4/1988 | Montrenec | 280/90 X |
| 4,773,514 | 9/1988 | Gustafsson | 280/90 X |

FOREIGN PATENT DOCUMENTS

| 57-47592 | 3/1982 | Japan . | |
| 60-45287 | 3/1985 | Japan . | |
| 60-219183 | 11/1985 | Japan . | |
| 0077566 | 4/1986 | Japan | 280/90 |
| 0012474 | 1/1987 | Japan | 280/90 |
| 63-140950 | 6/1988 | Japan . | |
| 63-227932 | 9/1988 | Japan . | |

Primary Examiner—Charles A. Marmor
Assistant Examiner—Alan M. Kagen
Attorney, Agent, or Firm—Rosen, Dainow & Jacobs

[57] ABSTRACT

A steering damper device includes a cylinder assembly having a plurality of fluid chambers providing a fluid circuit that is controlled by a control valve assembly which is operatively associated with a steering shaft to detect a steering force applied to the steering shaft. A flow rate control unit having a restriction for restricting a fluid flow in one direction is disposed in fluid passages which provide fluid communication between the fluid chambers through the control valve assembly. The steering damper device comprises an actuator in a hydraulically operated power steering apparatus including an oil pump and a reservoir tank. The cylinder assembly comprises a cylinder for generating an assistive steering force. The flow rate control unit restricts the flow flowing only from the control valve assembly to the oil pump.

5 Claims, 17 Drawing Sheets

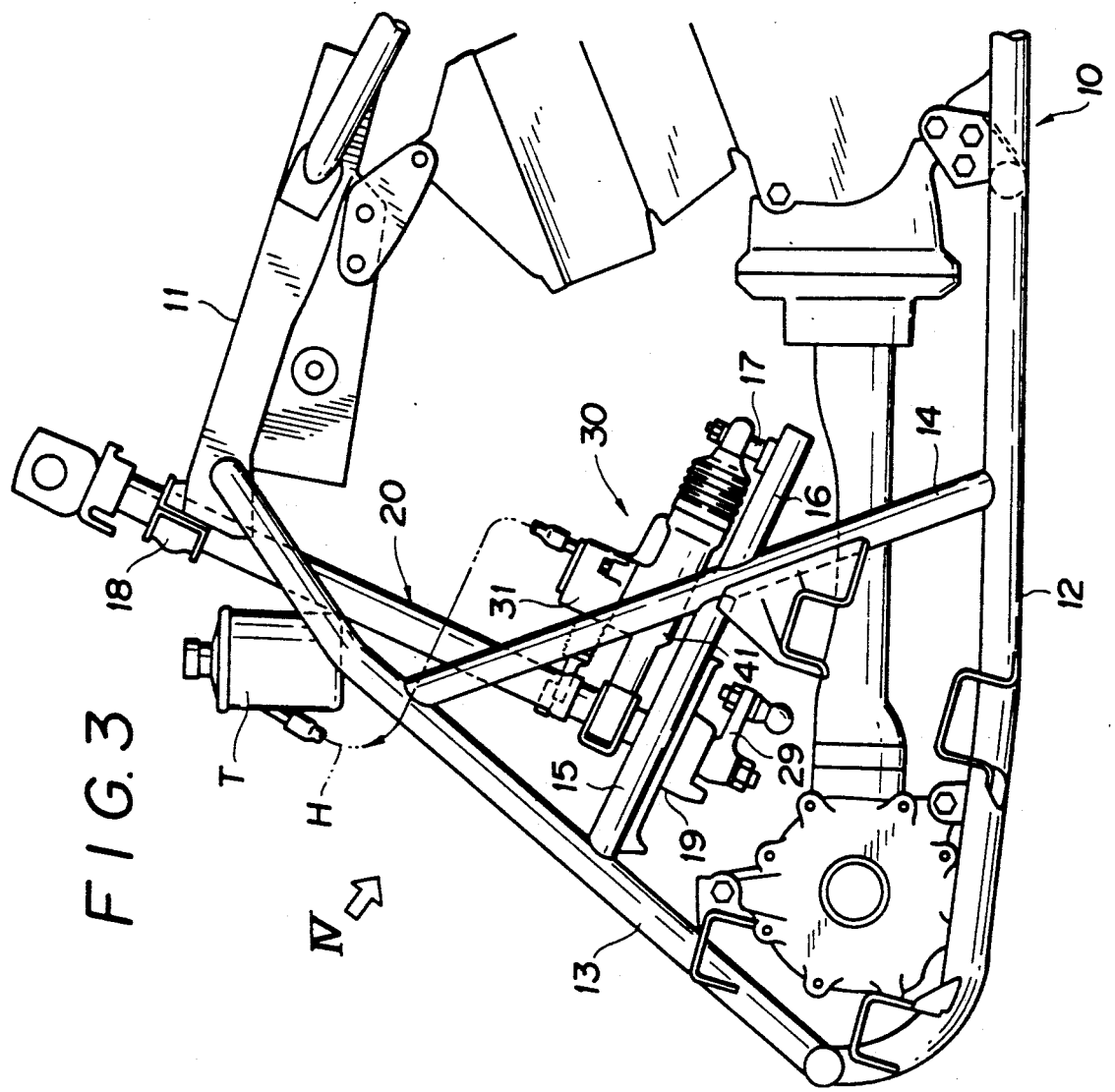
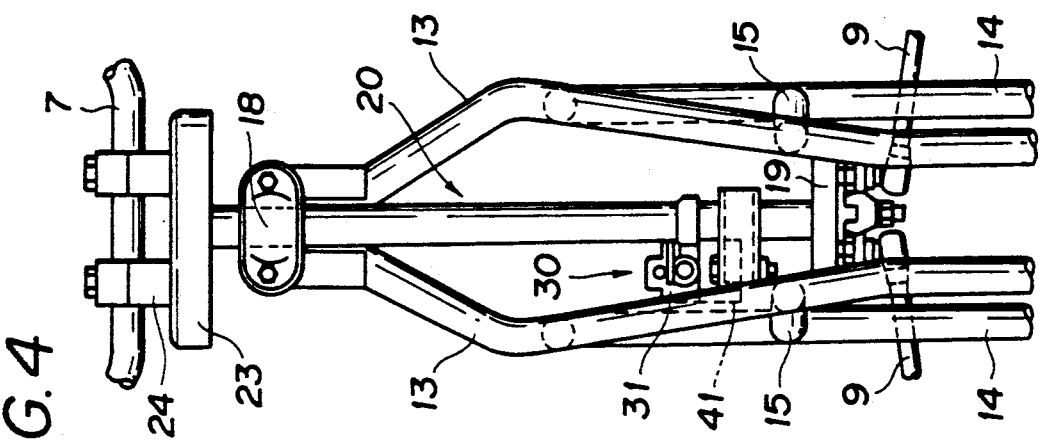

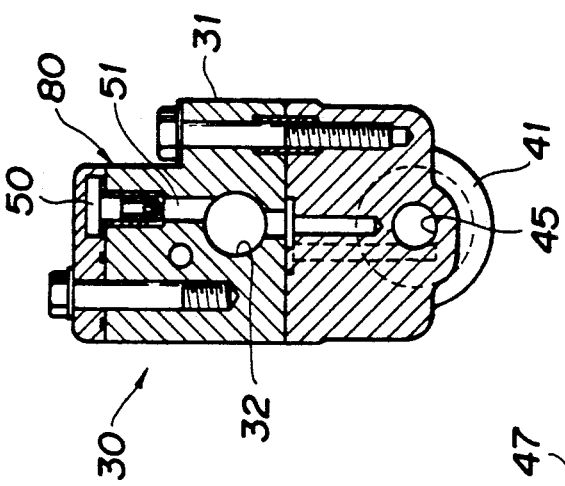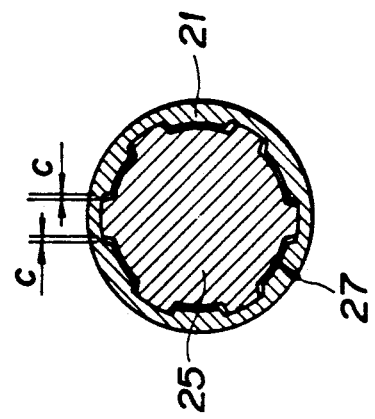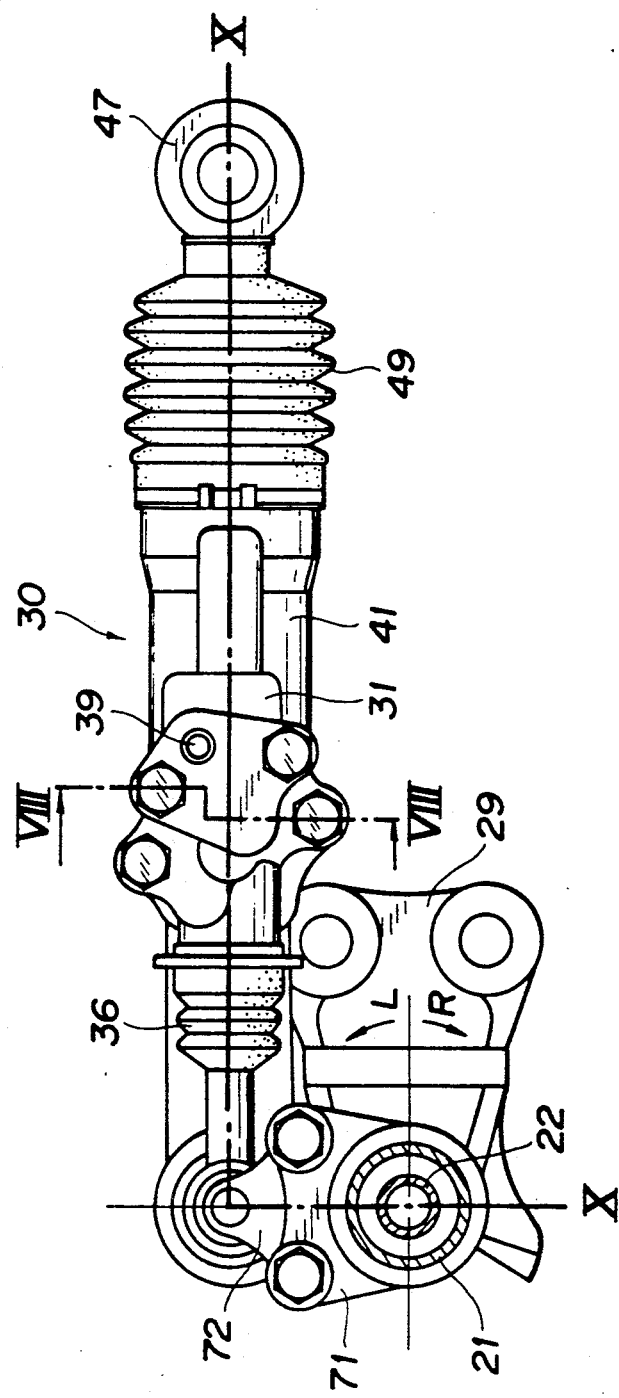

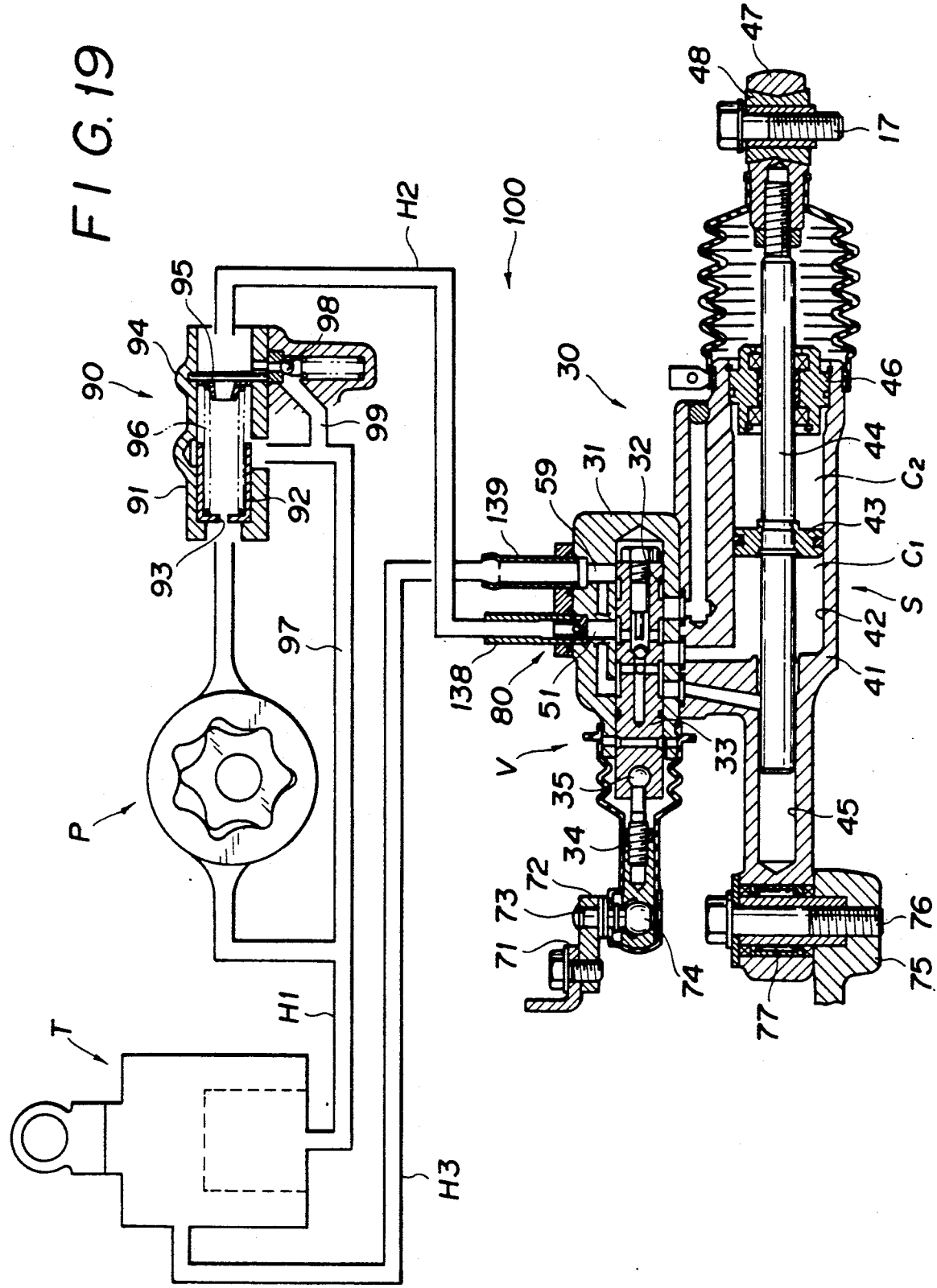

STEERING DAMPER DEVICE

BACKGROUND OF THE INVENTION

1. Field of the Invention

The present invention relates to a damper device, and more particularly to a steering damper device.

2. Description of the Relevant Art

There is known a steering damper device comprising a cylinder with a piston slidably fitted therein, the interior space of the cylinder being divided by the piston into two fluid chambers that communicate with each other through an orifice. Such a steering damper device is disclosed in Japanese Laid-Open Utility Model Publications Nos. 57-47592 (published on Mar. 17, 1982) and 60-45287 (published on Mar. 30, 1985), for example. Japanese Laid-Open Patent Publication No. 60-219183 (published on Nov. 1, 1985) shows a similar steering damper device including a detector for detecting a steering control factor, the restriction of the orifice being variably controlled by a detected signal from the detector.

The steering damper device disclosed in Japanese Laid-Open Patent Publication No. 60-219183 requires an electronic control circuit for controlling the orifice in response to a signal supplied from a steering force detector and indicating a detected steering force. The electronic control circuit is required to effect a complex control mode for calculating a steering acceleration, for example, in order to lower a kickback. The word "kickback" used herein means an instantaneous force transmitted as the resistance of a road to steerable wheels and acting on the driver's hand on the steering handle to counteract the steering handle which is turned by the driver. The disclosed steering damper device is therefore expensive to manufacture.

The present invention has been made in an effort effectively to solve the problems of the conventional steering damper devices.

SUMMARY OF THE INVENTION

It is an object of the present invention to provide a steering damper device which requires no complex and costly electronic control circuit, provides an appropriate damper function depending on an applied steering force, and generates a reliable damping force to reduce a kickback.

According to the present invention, there is provided a steering damper device comprising a control valve assembly operatively associated with a steering shaft for detecting a steering force applied to the steering shaft, a cylinder assembly having a plurality of fluid chambers providing a fluid circuit controllable by the control valve assembly, a plurality of fluid passages providing fluid communication between the fluid chambers through the control valve assembly, and a flow rate control unit disposed in the fluid passages and having restriction means for restricting a fluid flowing in one direction.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 3 is a fragmentary side elevational view of a front portion of the vehicle frame of the riding-type four-wheel motor vehicle of FIG. 1, showing the layout of the steering damper device and other components;

FIG. 4 is a front elevational view as viewed in the direction indicated by the arrow IV in FIG. 3;

FIG. 6 is a cross-sectional view taken along line VI—VI of FIG. 5;

FIG. 7 is a view as viewed in the direction indicated by the arrow VII in FIG. 5;

FIG. 8 is a cross-sectional view taken along line VIII—VIII of FIG. 7;

FIG. 19 is a cross-sectional view showing a hydraulic circuit in the steering damper device shown in FIG. 15;

DETAILED DESCRIPTION OF THE PREFERRED EMBODIMENTS

Figure 1:
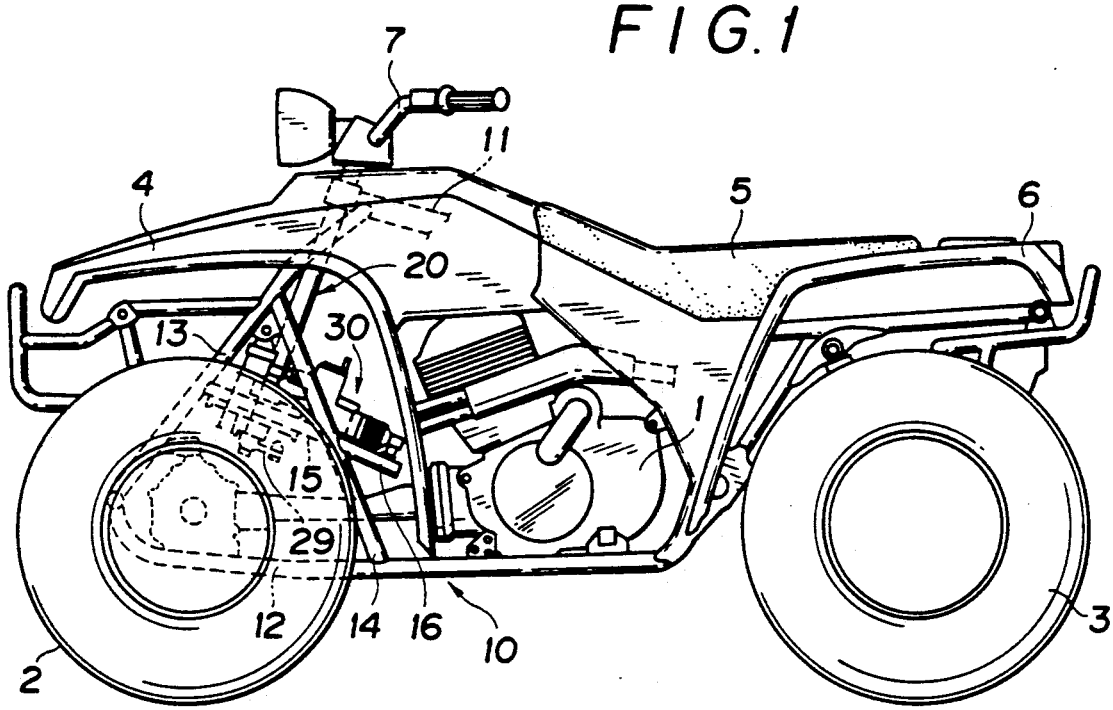
FIG. 1 is a side elevational view of a riding-type four-wheel motor vehicle incorporating a steering damper device according to a first embodiment of the present invention.
Figure 2:
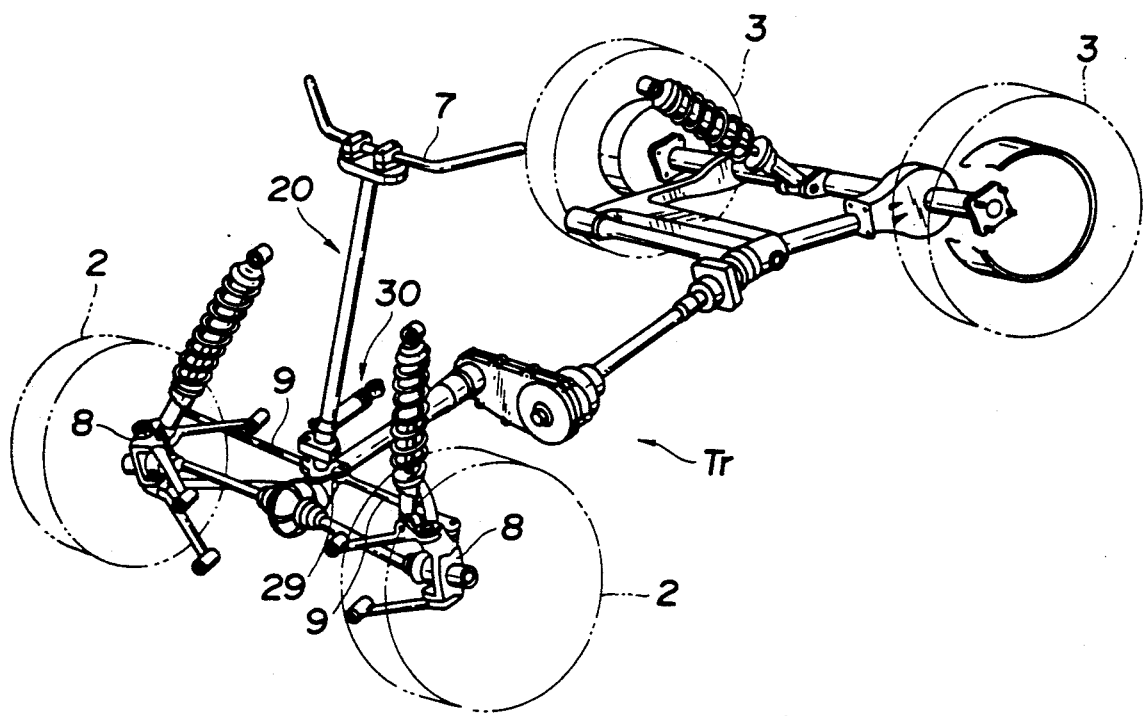
FIG. 2 is a schematic perspective view of a steering system, a power transmission system, and suspensions of the riding-type four-wheel motor vehicle shown in FIG. 1.

FIG. 1 shows a riding-type four-wheel motor vehicle with a rider's saddle, which incorporates therein a steering damper device 30 according to an embodiment of the present invention. The riding-type motor vehicle comprises an engine 1 mounted centrally in a vehicle frame 10, a pair of front wheels 2 and a pair of rear wheels 3 which are supported on the vehicle frame 10 by means of respective suspensions at front and rear positions and have respective low-pressure tires (see also FIG. 2). Power from the engine 1 is transmitted to the front and rear wheels 2, 3 through a power transmission mechanism Tr. The motor vehicle also has a front fender 4, a rider's saddle or seat 5, and a rear fender 6. The rider rides astride the seat 5 and grips a steering handlebar 7 disposed above the front fender 4 which covers a front portion of the vehicle frame 10. The handlebar 7 is fixed to the upper end of the steering shaft 20, as shown in FIG. 2. The steering shaft 20 has a lower portion coupled to the steering damper device 30. A steering arm 29 is secured to the lower end of the steering shaft 20 and connected through tie rods 9 (FIG. 2) to respective knuckle arms 8 supporting the front wheels 2.

As illustrated in FIGS. 3 and 4, the vehicle frame 10 has a front framework which is constructed of a pair of main pipes 11, a pair of lower pipes 12, a pair of front pipes 13, a pair of front cushion pipes 14, and a pair of lower steering shaft supporting pipes 15. The steering damper device 30 is disposed within the front framework of the vehicle frame 10. The steering shaft 20 has an upper portion supported on a holder 18 mounted on the front ends of the main pipes 11 and a lower portion supported on a bracket 19 extending between and attached to the lower steering shaft supporting pipes 15. The steering damper device 30 has a rear portion pivotally supported by a vertical shaft 17 on a pipe end 16 extending rearwardly from the righthand pipe 15.

Figure 5:
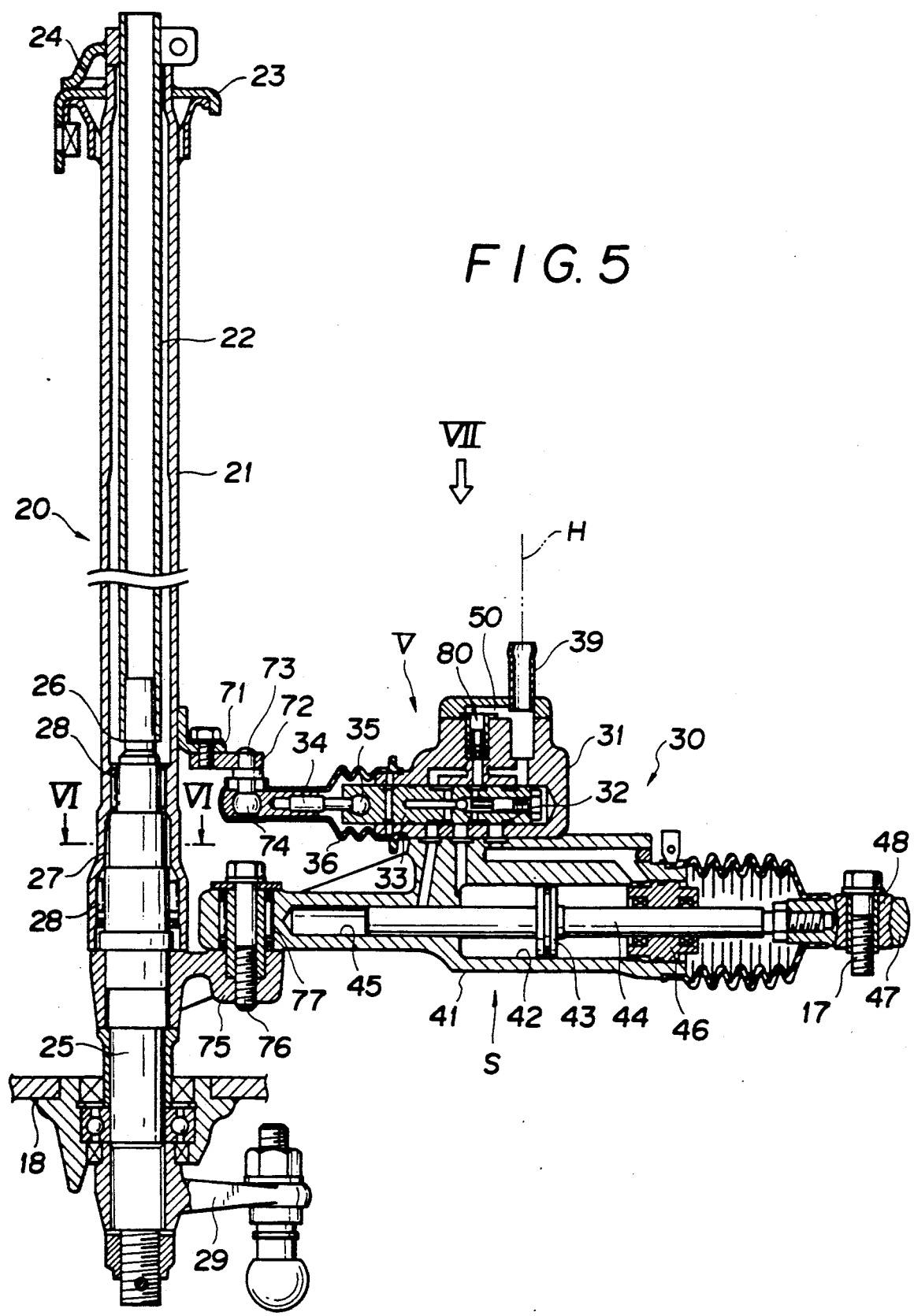
FIG. 5 is a vertical cross-sectional view of a steering shaft and the steering damper device in the motor vehicle.

As shown in FIG. 5, the steering damper device 30 mainly comprises a control valve assembly V and a power cylinder assembly S. An oil reservoir tank T (FIG. 3) of the steering damper device 30 is fixedly positioned between upper portions of the front pipes 13. The oil reservoir tank T is connected to a valve body 31 (described later) through a hose H. The oil reservoir tank T serves to compensate for an oil overflow or shortage caused by movement of a piston rod 44 into and out of a cylinder hole 45. The oil reservoir tank T is also effective to make up for changes in the volume of oil in a cylinder body 41 which are caused by temperature changes.

As shown in FIG. 5, the steering shaft 20 comprises an outer shaft 21, an inner shaft 22 extending coaxially through the outer shaft 21, and a shaft end 25. The outer and inner shafts 21, 22 which are in the form of pipes have upper ends coupled to a steering bridge 23 to which the handlebar 7 is fixed by a pair of pipe connectors 24 (FIG. 4). The inner shaft 22 serves as a torsion bar. The shaft end 25 has an upper end inserted into the lower end of the inner shaft 22 and fixed thereto by a welded coupling 26. The inner peripheral surface of the lower portion of the outer shaft 21 and the outer peripheral surface of the upper portion of the shaft end 25 are coupled to each other through splines 27 with gaps or plays c created on each side thereof in the direction in which the outer shaft 21 and the shaft end 25 are angularly movable with respect to each other, as shown in FIG. 6. Two bearings 28 are interposed between the outer shaft 21 and the shaft end 25 at respective positions above and below the splines 27. The steering arm 29 is fixedly attached to the lower end of the shaft end 25.

Figure 9:
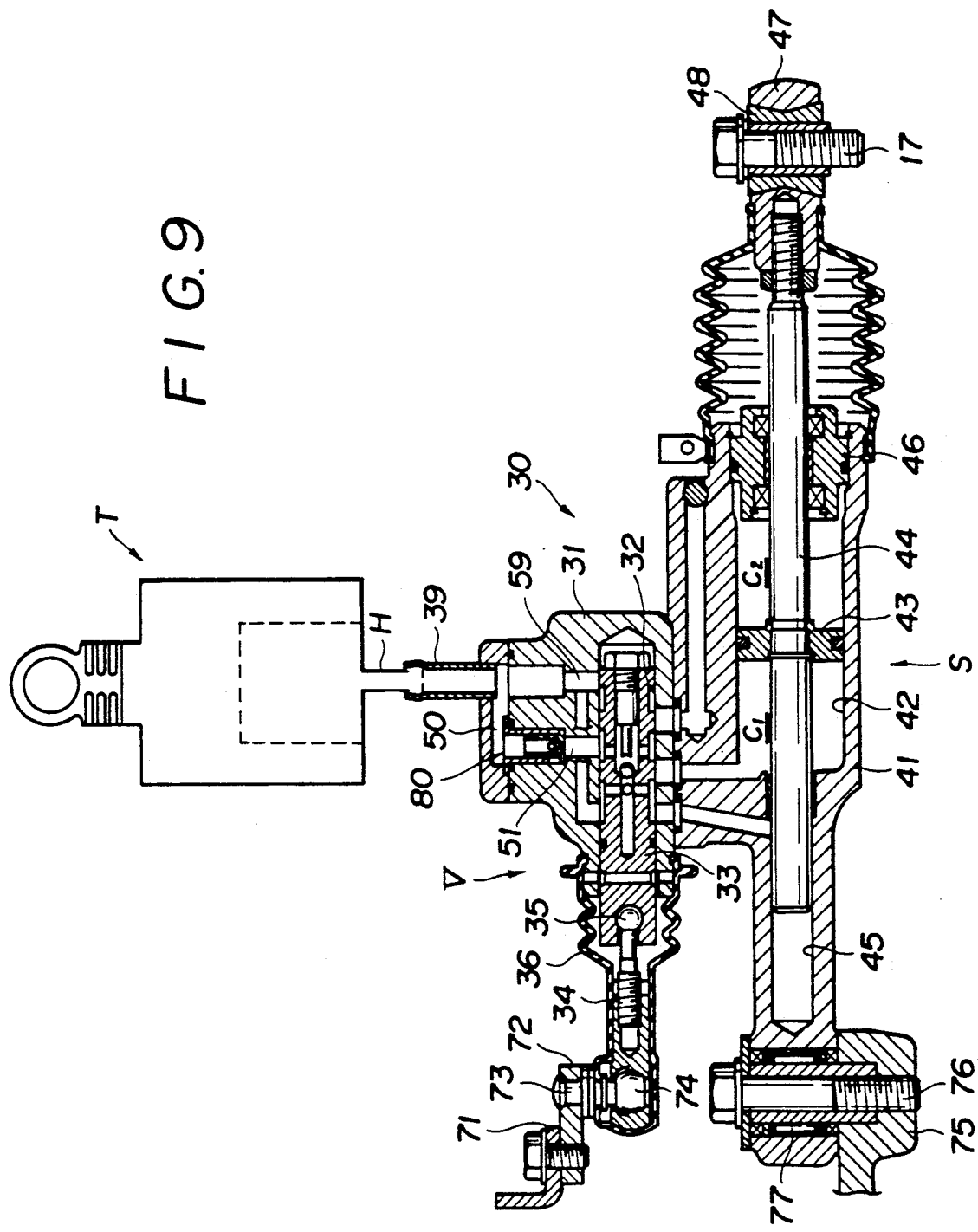
FIG. 9 is a cross-sectional view showing a hydraulic circuit in the steering damper device.

As shown in FIGS. 7 through 9, the steering damper device 30 generally comprises a cylinder body 41 and a valve body 31 bolted to the cylinder body 41. The valve body 31 has a valve hole 32 defined therein and opening at its front side. The cylinder body 41 has a cylinder 42 defined therein and opening at its rear side. The valve hole 32 is disposed above the cylinder 42 and extends parallel thereto.

The valve body 31 includes a spool valve 33 disposed therein and a spool rod 34 pivotally coupled to a front projection portion of the spool valve 33 by means of a ball-and-socket joint 35. The cylinder body 31 and the spool valve 33 jointly constitute the control valve assembly V. A piston 43 slidably disposed in the cylinder 42 with a seal therebetween has a piston rod 44 including a front portion slidably fitted in a rod hole 45 which is defined in a front portion of the cylinder body 41. The interior space of the cylinder 42 is divided by the piston 43 into a front fluid chamber C1 and a rear fluid chamber C2 (FIG. 9). A boot 36 is disposed between the valve body 31 and the spool rod 34. The valve body 31 has a joint 39 vertically disposed on an upper surface thereof for connection to the hose H. The piston rod 44 has a rear portion sealed by a rod guide 46 in the cylinder 42 and projecting rearwardly out of the cylinder 42. A rod end 47 having a rubber bushing 48 with a collar therein is mounted on the projecting rear end of the piston rod 44. The rod end 47 is pivotally supported on the vertical shaft 17 for allowing the steering damper device 30, except the tank T, to swing laterally about the vertical shaft 17. Between the cylinder body 41 and the rod end 47, there is disposed a boot 49 covering the exposed rear portion of the piston rod 44.

A stay 71 is welded or otherwise fixed to the outer periphery of a lower portion of the outer shaft 21. A spool lever 72 is bolted to the righthand side of the stay 71 and projects to the righthand side of the motor vehicle. The spool rod 34 is pivotally coupled to the righthand end of the spool lever 72 through a vertical pin 73 and a ball-and-socket joint 74. A central arm 75 is fixed to the outer periphery of an intermediate portion of the shaft end 25 and projects to the righthand side of the motor vehicle. The front end of the cylinder body 41 is pivotally coupled by a vertical bolt 76 through a bearing 77 to a projecting righthand end of the central arm 75.

In this embodiment, when the motor vehicle runs straight ahead with the handlebar 7 not turned, the vertical axis of the vertical pin 73 (i.e., the vertical axis of the ball-and-socket joint 74) and the vertical axis of the vertical bolt 76 are aligned with each other.

The valve body 31 of the steering damper device 30 has a communication passage 50 defined in an upper portion thereof and including an oil passage 51 housing therein a flow rate control unit 80 for reducing a kickback.

Figure 10:
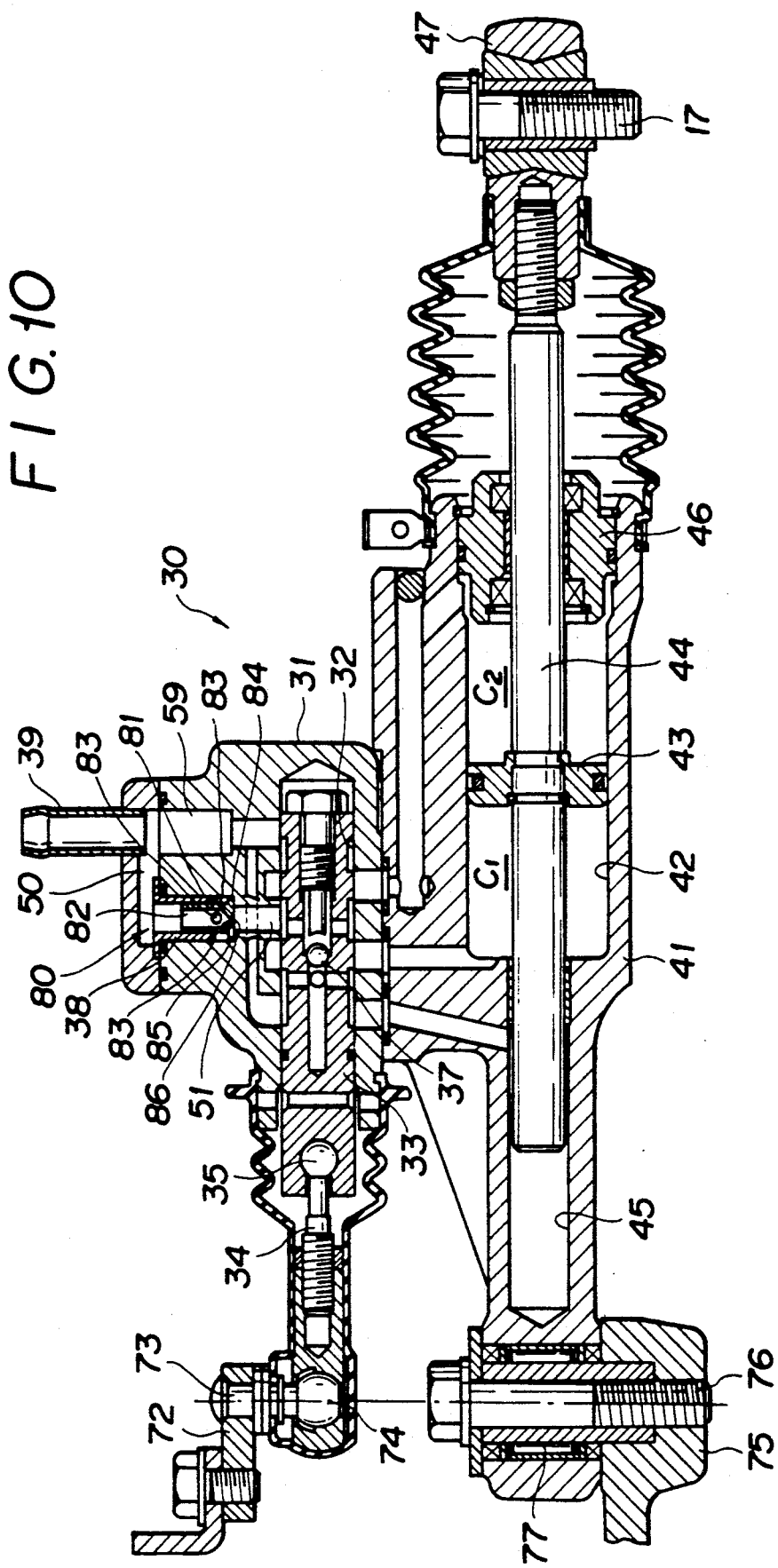
FIG. 10 is an enlarged vertical cross-sectional view taken along line X—X of FIG. 7, showing the steering damper device at the time the motor vehicle runs straight ahead.

As shown in FIG. 10, the flow rate control unit 80 comprises a hollow valve collar 38 fixedly fitted in an upper larger-diameter portion 81 of the oil passage 51, and a hollow one-way valve 82 vertically slidably fitted in a lower portion of the collar 38. The one-way valve 82 has a plurality of through holes 83 defined radially in lower portion thereof. The valve 82 has a flange 84 on the lower end thereof which is held in slidable contact with the inner peripheral surface of the larger-diameter portion 81, the flange 84 having a recess 85 defined radially therein. The one-way valve 82 has an orifice 86 defined centrally in the bottom thereof. The orifice 86 serves as a restriction when working oil flows in an opposite direction, as described later on.

FIG. 10 shows the steering damper device 30 at the time the motor vehicle runs straight ahead with the handlebar 7 not turned. The spool valve 33 houses therein a check valve 37 for allowing working oil to flow only from an oil passage 59 of the communication passage 50 to the oil passage 51.

When the handlebar 7 is turned to the right, the outer shaft 21 is rotated clockwise as indicated by the arrow R in FIG. 7 and at the same time the inner shaft 22 is twisted depending on the steering force applied to the handlebar 7. As described above, the outer shaft 21 is coupled to the steering shaft end 25 through the splines 27 with the gaps c (FIG. 6). Upon rotation of the outer shaft 21, the spool rod 34 pivotally coupled to the spool lever 72 joined the outer shaft 21 is thus moved rearwardly as indicated by the arrow in FIG. 11. The inner shaft 22 fixed to the shaft end 25 is twisted depending on the steering force through an angle corresponding to each gap c. Therefore, the inner shaft 22 serves as a torsion bar lagging the outer shaft 21 upon rotation thereof, i.e., there is a certain phase difference between the inner shaft 22 and the outer shaft 21. A steering force commensurate with the twist of the inner shaft 22 is thus applied to the shaft end 25 and hence from the central arm 75 to the cylinder body 41. Accordingly, during an initial phase of the steering operation, the spool lever 72 on the input side of the steering damper device is rotated about the central axis of the steering shaft 20 with a phase difference with the central arm 75 on the output side of the steering damper device.

The phase difference between the outer shaft 21 and the inner shaft 22 is amplified by the radius of angular movement of the spool lever 72, and the amplified phase difference is transmitted from the spool rod 34 to the spool valve 33. The cylinder body 41 and the valve body 31 are moved rearwardly with the rearward movement of the spool valve 33, with a delay corresponding to the amplified phase difference. The rearward movement of the spool valve 33 with respect to the valve body 31 allows working oil in the damper device 30 to flow as indicated by arrows in FIG. 11.

More specifically, when the cylinder body 41 is urged to move rearwardly, since the piston 43 is fixed with respect to the vehicle frame, oil in the front fluid chamber C1 in the cylinder 42 is put under compression. The oil under compression flows through oil passages 52, 53 into a recess 63 defined in the spool valve 33, and oil in the rod hole 45 also flows through oil passages 53, 55 into the recess 63. The combined oil supplied to the recess 63 then flows from an oil passage 64 into the oil passage 59, from which it slows through the communication passage 50, the holes 83 of the one-way valve 82, and the recess 85 into the oil passage 51. Then, the oil flows through a central recess 61 in the spool valve 33 and oil passages 56, 57, 58 into the rear fluid chamber C2 in the cylinder 42. While the oil is thus flowing, the amount of oil displaced by the piston rod 44 pushed into the rod hole 45 flows from the oil passage 59 into the oil reservoir tank T.

Figure 11:
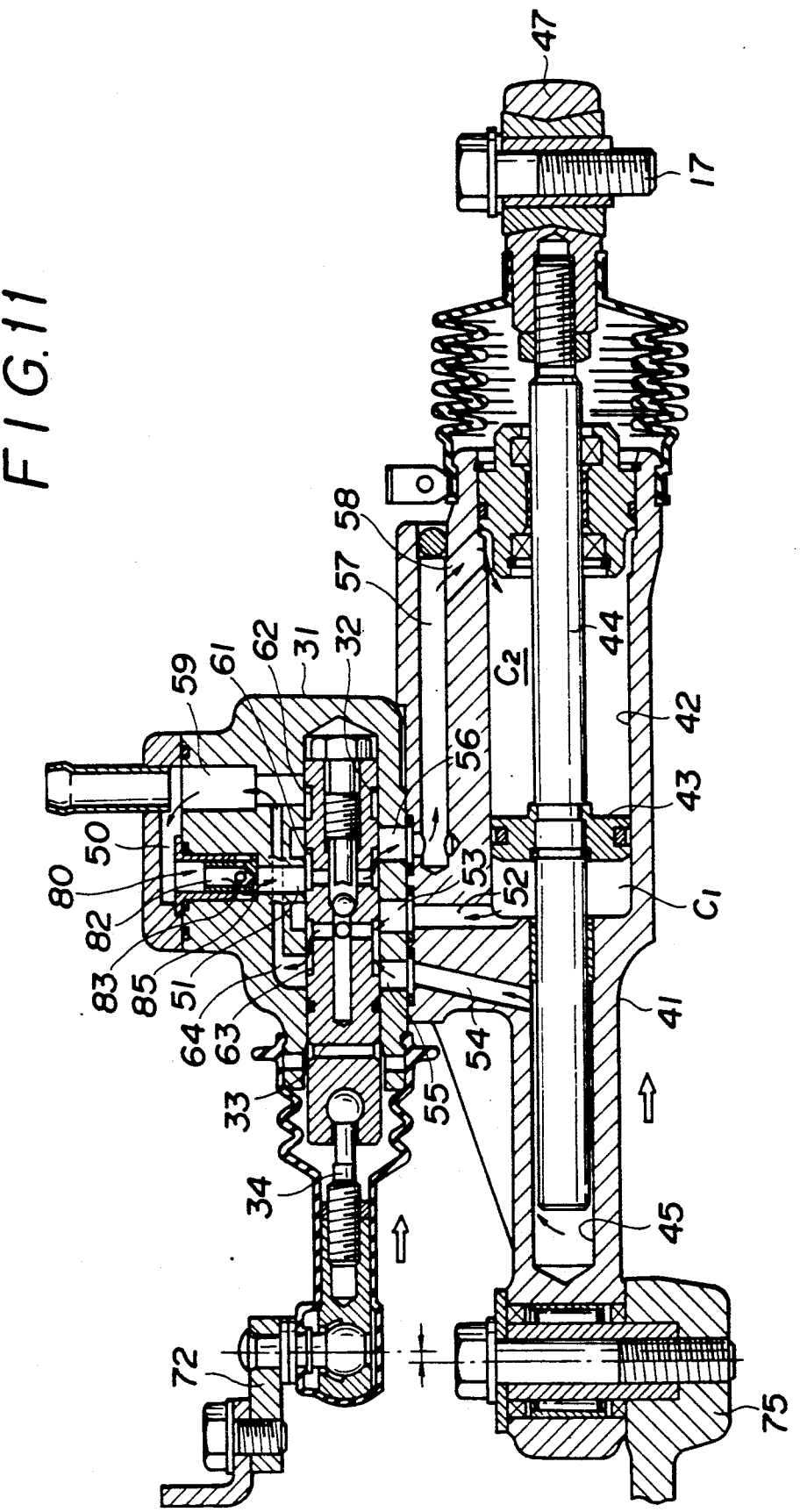
FIG. 11 is a view similar to FIG. 10, showing the steering damper device at the time the steering handle is turned to the right.

While the working oil is flowing from the front fluid chamber C1 through the spool valve 33 into the rear fluid chamber C2 as shown in FIG. 11, the spool valve 33 does not impose any substantial resistance to the flow of oil.

As described above, the piston rod end 47 is pivotally supported on the vehicle frame 10 (i.e., the righthand pipe end 16) through the rubber bushing 48 for angular movement about the vertical shaft 17. Therefore, lateral swinging movement of the steering damper device 30 in response to rotation of the spool lever 72 and the central arm 75 in normal steering operation can be absorbed by the swingably supported piston rod end 47.

When the twist of the inner shaft 22 caused by the handlebar 7 exceeds the gap c, the steering force applied from the splines 27 is directly transmitted to the steering shaft end 25. This holds true also for a steering action to turn the handlebar 7 to the left.

When the handlebar 7 is turned to the left, the outer shaft 21 is rotated counterclockwise as indicated by the arrow L in FIG. 7 and at the same time the inner shaft 22 is twisted depending on the steering force applied to the handlebar 7. As the outer shaft 21 is rotated, the spool rod 34 pivotally joined to the spool lever 72 secured to the outer shaft 21 is moved forwardly as indicated by the arrow in FIG. 12.

The inner shaft 22 secured to the shaft end 25 is twisted depending on the gap c, and hence serves as a torsion bar delayed by a phase difference from the outer shaft 21 as it rotates. The steering force corresponding to the twist of the inner shaft 22 is applied to the shaft end 25, and as a result is applied from the central arm 75 fixed to the shaft end 25 to the cylinder body 41. During an initial phase of the steering action to the left, the input spool lever 72 is also rotated about the central axis of the steering shaft 20 with a certain phase difference with the output central arm 75.

The phase difference between the outer shaft 21 and the inner shaft 22 is amplified by the radius of angular movement of the spool lever 72, and the amplified phase difference is transmitted from the spool rod 34 to the spool valve 33. The cylinder body 41 and the valve body 31 are moved forwardly with the forward movement of the spool valve 33, with a delay corresponding to the amplified phase difference. The forward movement of the spool valve 33 with respect to the valve body 31 allows working oil in the damper device 30 to flow as indicated by arrows in FIG. 12.

More specifically, when the cylinder body 41 is urged to move forwardly, since the piston 43 is fixed with respect to the vehicle frame, oil in the rear fluid chamber C2 in the cylinder 42 is put under compression. The oil under compression flows through the oil passages 58, 57, 56 and the recess 62 into the oil passage 59, from which the oil flows through the communication passage 50, the holes 83 of the one-way valve 82, and the recess 85 into the oil passage 51. Then, the oil flows through the recess 61 and the oil passages 53, 52 into the front fluid chamber C1 in the cylinder 42. Concurrent with this, a portion of the oil directed from the recess 62 to the oil passage 59 flows through the oil passage 64, the recess 63, and the oil passage 55, 54 into the rod hole 45. While the oil is thus flowing, the amount of oil introduced into the rod 45 by the piston rod 44 withdrawn out of the rod hole 45 flows from the oil reservoir tank T into the communication passage 59.

While the working oil is flowing from the front fluid chamber C2 through the spool valve 33 into the rear fluid chamber C1 at the time the handlebar 7 is turned to the left, the spool valve 33 does not impose any substantial resistance to the flow of oil.

As described above with reference to FIGS. 11 and 12, while the handlebar 7 and the wheels 2 are being turned or steered in the same direction, the oil flowing between the fluid chambers C1, C2 through the spool valve 33 is not subjected to any substantial resistance. Specifically, when the oil flows from the communication passage 50 through the one-way valve 82 to the oil passage 51, the oil does not undergo any substantial resistance. As a result, the steering action can be well performed irrespective of whether the handlebar 7 is turned to the right or left, insofar as the handlebar 7 and the wheels 2 are steered or turned in the same direction.

Since the cylinder 42 has in its front portion the rod hole 45 in which the piston rod 44 is movable back and forth, it is not necessary to provide any seal in the front wall of the cylinder 42. Oil can be supplied to and discharged from the rod hole 45 through the oil passage 57 when the piston rod 44 is moved. Thus, the piston rod 44 can smoothly be moved back and forth without substantial resistance.

Figure 13:
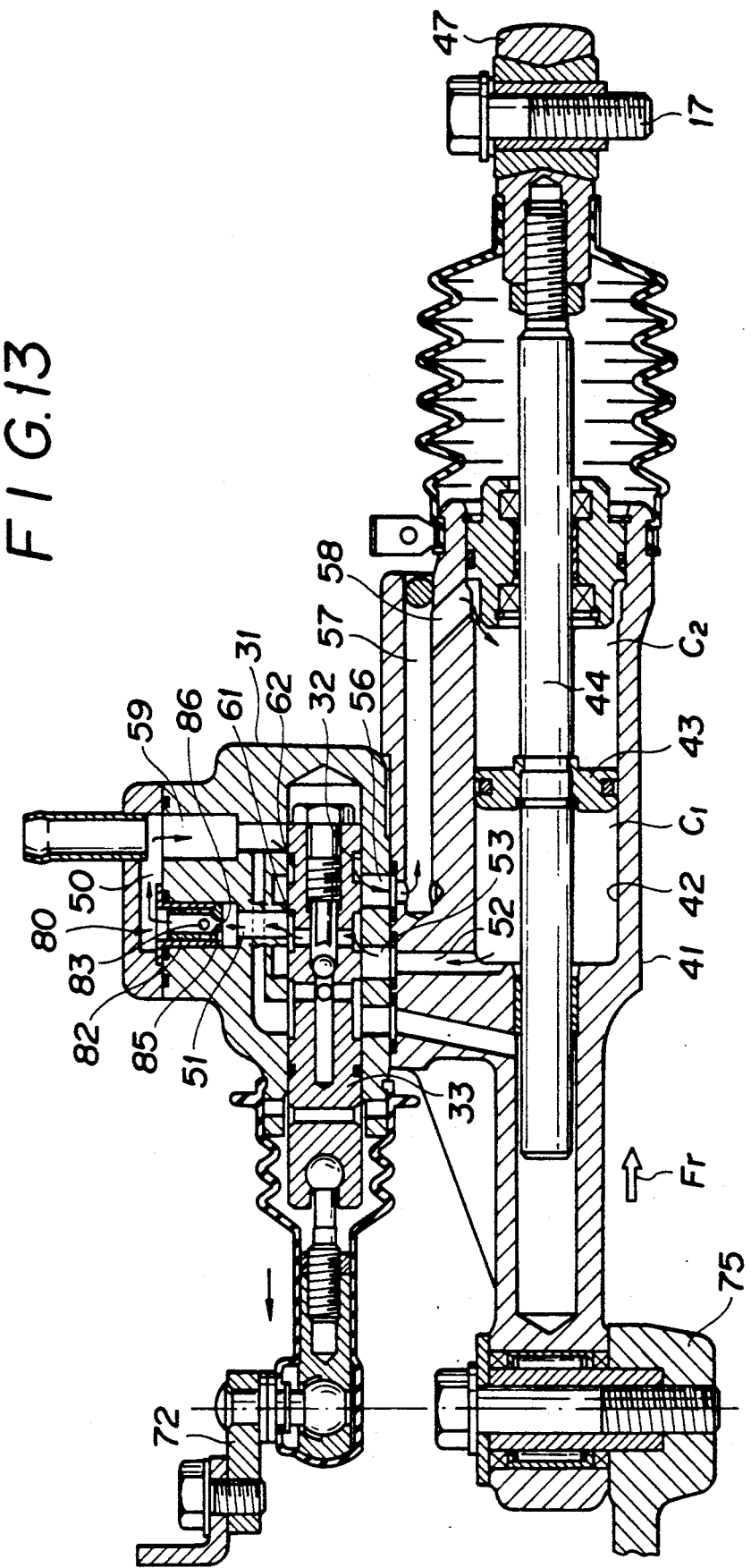
FIG. 13 is a view similar to FIG. 10, showing the steering damper device when a kickback is produced at the time the steering handle is turned to the right.

The motor vehicle runs straight ahead if the handlebar 7 is not turned. When a reactive force from the road is applied which tends to urge the wheels 2 to be steered to the right while the motor vehicle is running straight ahead, the shaft end 25 is subjected to a force applied in the direction indicated by the arrow R in FIG. 7. Therefore, the central arm 75 also undergoes the force indicated by the arrow R, with the result that the cylinder body 41 is urged to move rearwardly as indicated by the arrow Fr in FIG. 13. At this time, the oil tends to flow as indicated by the arrows in FIG. 13. More specifically, the cylinder body 41 tends to move rearwardly, and since the piston 43 is fixed with respect to the vehicle frame 10, oil in the front fluid chamber C1 in the cylinder 42 is placed under compression. The oil under compression flows through the oil passages 52, 53 and the recess 61 into the oil passage 51. The oil flow moves the one-way valve 82 up to its upper limit position, in which the holes 83 and the recess 85 are closed by the valve collar 38. Therefore, the oil flows only through the orifice 86 into the communication passage 50. The oil flow is restricted by the orifice 86 to produce a damping force which limits relative movement of the cylinder 42 and the piston 43. Therefore, any kickback applied from the road to the handlebar 7 is reduced.

Figure 14:
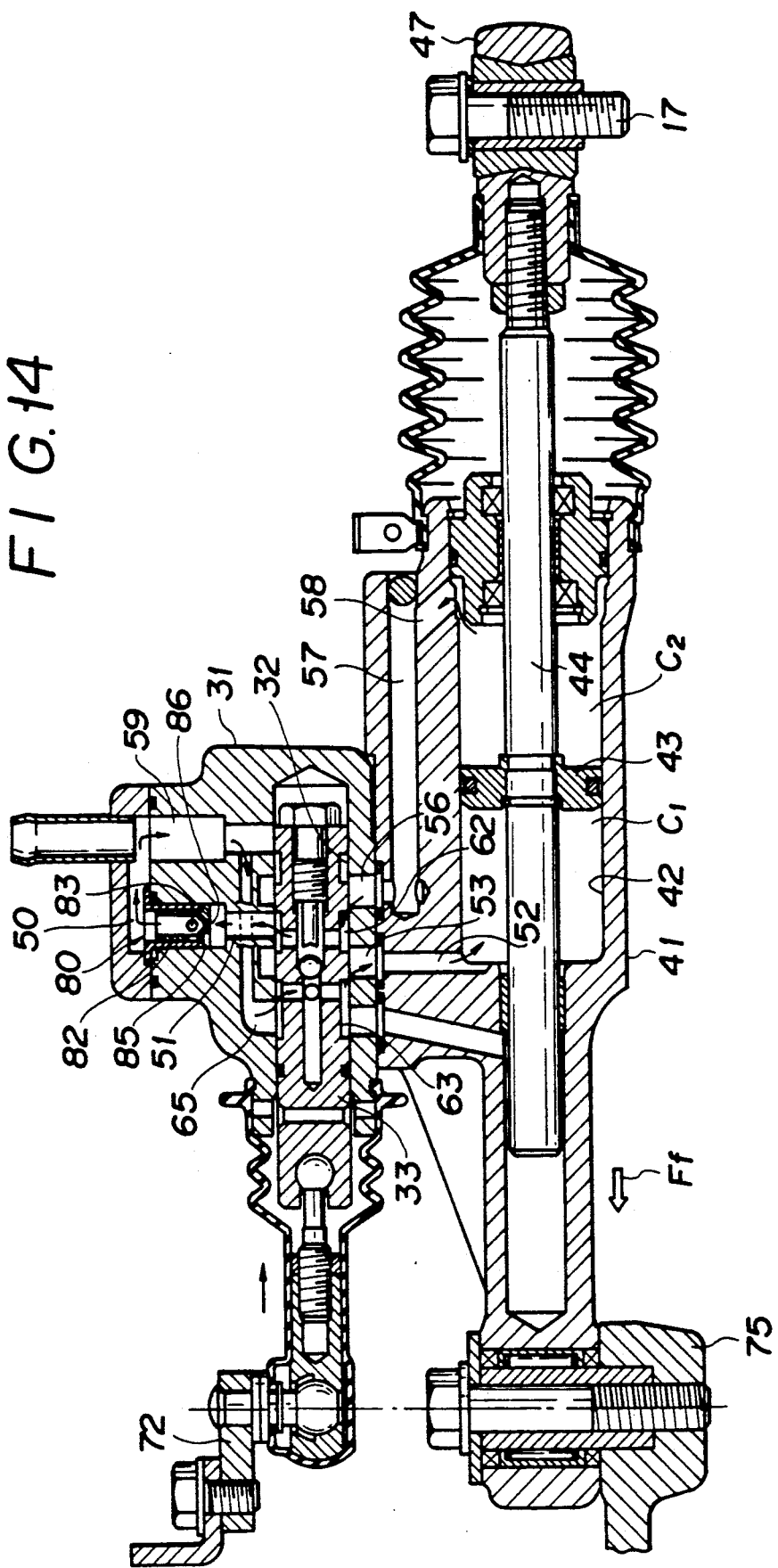
FIG. 14 is a view similar to FIG. 10, showing the steering damper device when a kickback is produced at the time the steering handle is turned to the left.

When a reactive force from the road is applied which tends to urge the wheels 2 to be steered to the left while the motor vehicle is running straight ahead, the shaft end 25 is subjected to a force applied in the direction indicated by the arrow L in FIG. 7. Therefore, the central arm 75 also undergoes the force indicated by the arrow L, with the result that the cylinder body 41 is urged to move forwardly as indicated by the arrow Ff in FIG. 14. At this time, the oil tends to flow as indicated by the arrows in FIG. 14. More specifically, the cylinder body 41 tends to move forwardly, and since the piston 43 is fixed with respect to the vehicle frame 10, oil in the rear fluid chamber C2 in the cylinder 42 is placed under compression. The oil under compression flows through the oil passage 58, 57, 56 and the recess 61 into the oil passage 51. The oil flow moves the one-way valve 82 up to its upper limit position, in which the holes 83 and the recess 85 are closed by the valve collar 38. Therefore, the oil flows only through the orifice 86 into the communcation passage 50. The oil flow is restricted by the orifice 86 to produce a damping force which limits relative movement of the cylinder 42 and the piston 43. Therefore, any kickback applied from the road to the handlebar 7 is reduced, as with the mode of operation shown in FIG. 13.

Figure 12:
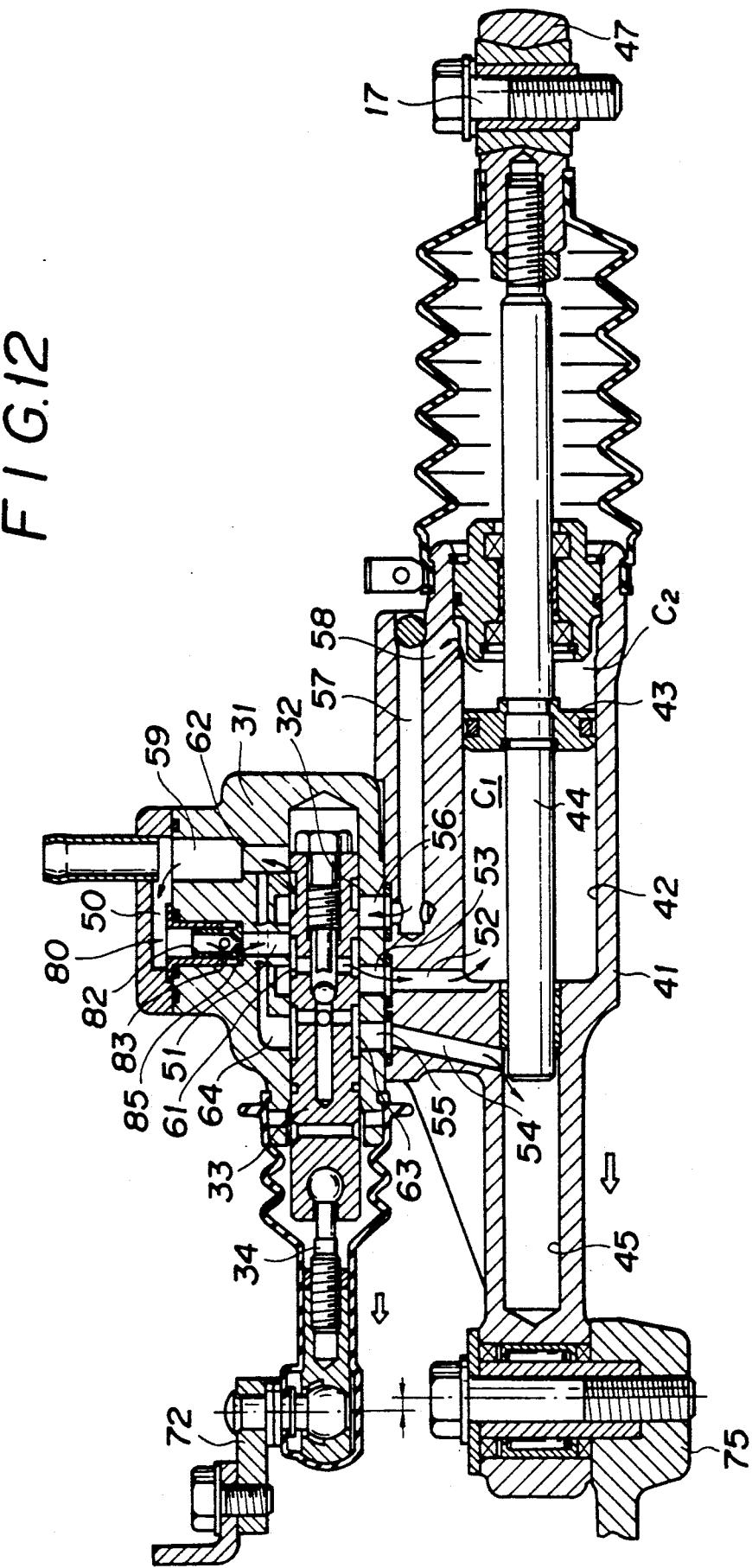
FIG. 12 is a view similar to FIG. 10, showing the steering damper device at the time the steering handle is turned to the left.

When a reactive force from the road is applied to the wheels 2 while the handlebar 7 is being turned as shown in FIGS. 11 and 12, the one-way valve 82 of the flow rate control unit 80 is moved upwardly, thus producing a damping force which reduces any kickback from the road.

Since the steering damper device 30 has the control valve assembly V operatively coupled to the steering shaft 20 for detecting a steering force, the damper function can be performed depending on the steering force which is detected by the control valve assembly V.

The communication passsage 50 which provides fluid communication between the fluid chambers C1, C2 through the control valve assembly V has the flow rate control unit 80 which includes the restriction function provided by the orifice 86. The flow rate control unit 80 generates a damping force only when the direction in which the handlebar 7 is turned and the direction in which the wheels 2 are steered are not the same as each other. Accordingly, movement of the fluid or oil placed under compression in any one of the fluid chambers C1, C2 due to a reactive force applied from the road to the wheels 2 is first controlled by the control valve assembly V, and then the orifice 86 of the flow rate control unit 80 reliably generates a damping force on the fluid movement. As a result, any undesirable kickback is reduced.

A kickback produced by an excessive reactive force applied from the road to the wheels 2 can reliably be minimized by the control valve assembly V.

The steering damper device 30 is inexpensive to manufacture as it includes no complex electronic control circuit.

The steering damper device 30 may be incorporated in general motor vehicle rather than the illustrated riding-type four-wheel motor vehicle. The steering damper device 30 can easily be added to commercially available motor vehicles simply by replacing their steering systems.

A steering damper device 130 according to a second embodiment of the present invention will be described below with reference to FIGS. 15 through 23. The steering damper device 130 is of essentially the same construction as that of the steering damper device 30. Those parts of the steering damper device 130 which are identical to those of the steering damper device 30 are denoted by identical reference numerals, and will not be described in detail.

Figure 15:
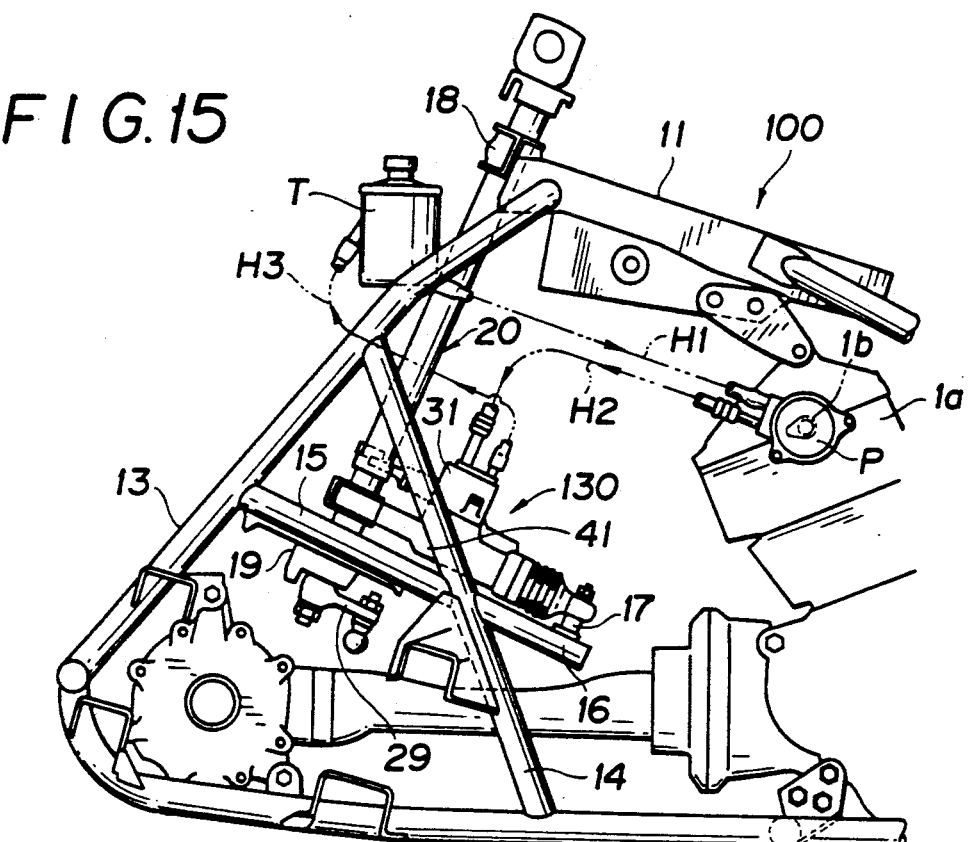
FIG. 15 is a fragmentary side elevational view of a front portion of a riding-type four-wheel motor vehicle incorporating a steering damper device according to a second embodiment of the present invention.
Figure 17:
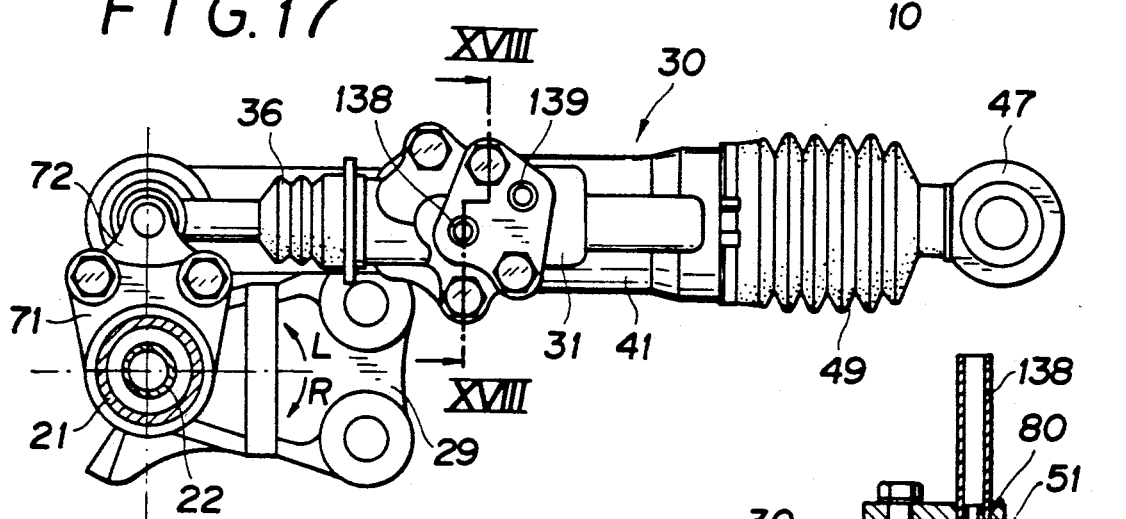
FIG. 17 is a view as viewed in the direction indicated by the arrow XVII in FIG. 16.
Figure 18:
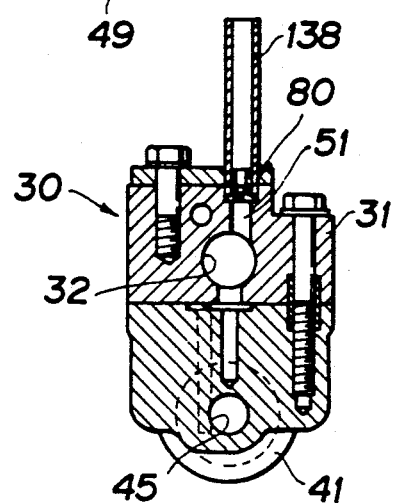
FIG. 18 is a cross-sectional view taken along line XVIII—XVIII of FIG. 17.

The steering damper device 130 differs from the steering damper device 30 only in that the steering damper device 130 is combined with a hydraulically operated power steering apparatus 100 having an oil pump P as shown in FIG. 15, and a cylinder assembly S of the steering damper device 130 normally acts as an actuator for generating an assistive steering force. The power steering apparatus 100 is installed on a riding-type four-wheel motor vehicle identical to that shown in FIG. 1, and assists the rider in turning the handlebar 7. In the steering damper device 130, the communication passage 50 is dispensed with, and the oil passages 51, 59 serve as supply and return oil passages.

The steering damper device 130 will hereinafter be referred to as an actuator 130.

Figure 16:
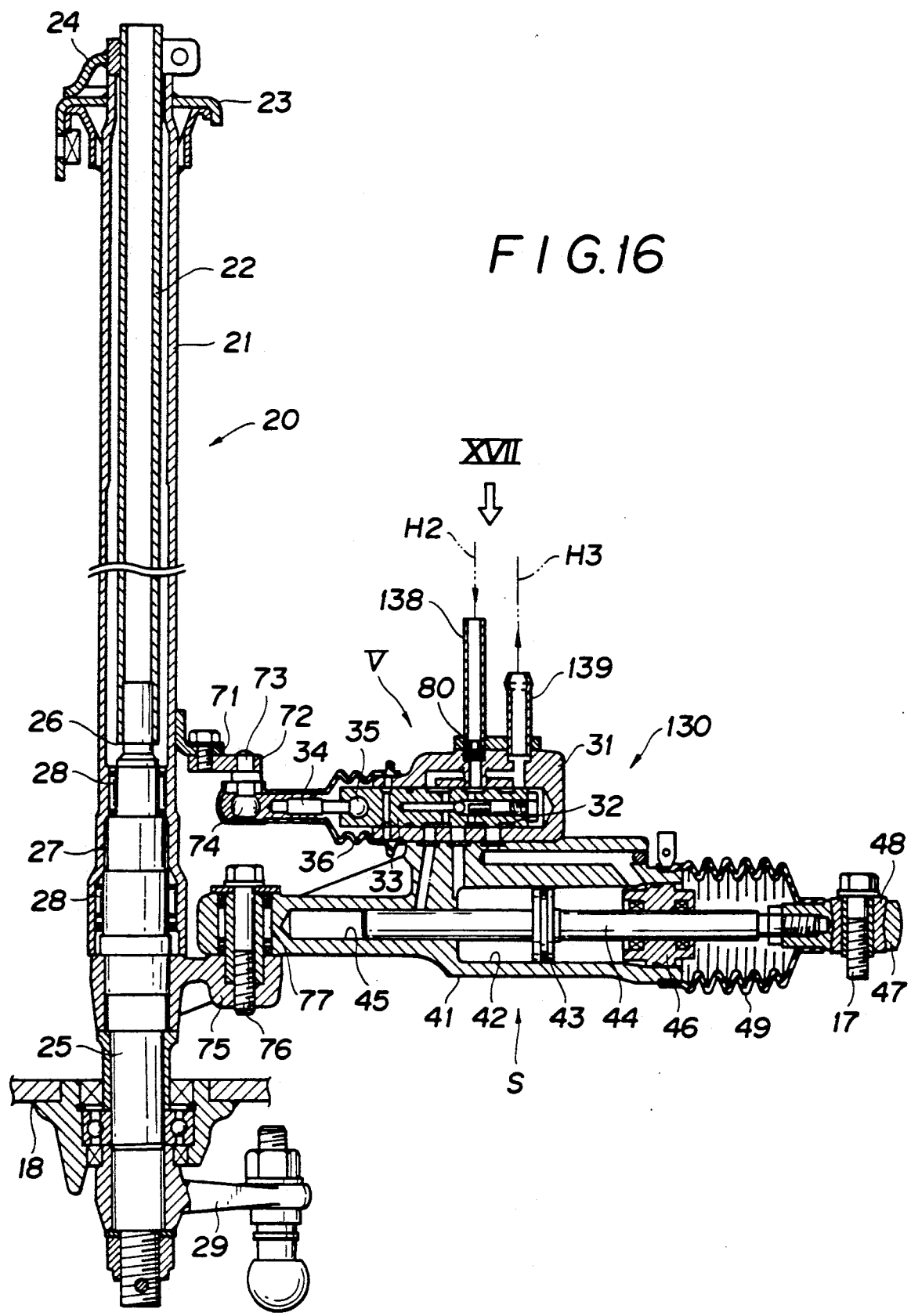
FIG. 16 is a vertical cross-sectional view of a steering shaft and the steering damper device in the motor vehicle of FIG. 15.
Figure 20:
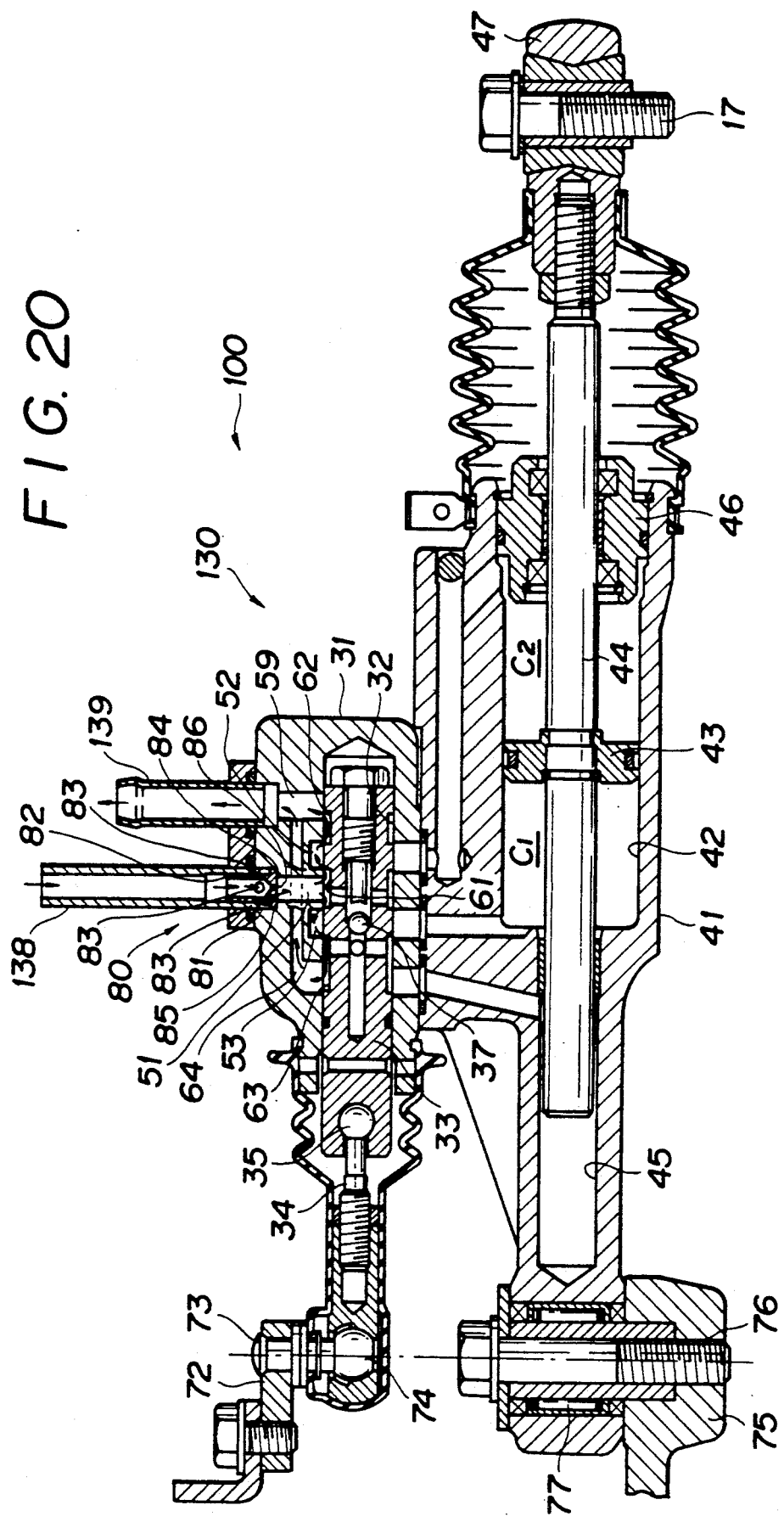
FIG. 20 is an enlarged vertical cross-sectional view of the steering damper device of FIG. 15, at the time the motor vehicle runs straight ahead with the steering handle not turned.

As shown in FIG. 15, the oil pump P comprises a trochoid pump which is mounted on a cylinder head 1a of the engine 1 and drivable by a camshaft 1b of the engine 1. The oil reservoir tank T is fixedly disposed between the front pipes 13. The oil pump P and the reservoir tank T are connected to each other by a suction hose H1. The oil pump P is connected to the actuator 130 by means of a feed hose H2. The actuator 130 is coupled to the reservoir tank T by a return hose H3. as shown in FIGS. 16 and 20, joints 138, 139 connected respectively to the hose H2, H3 are vertically mounted on the upper surface of the valve body 31.

FIG. 19 shows a hydraulic pressure control circuit of the power steering apparatus 100. A flow regulating valve 90 is connected to the outlet of the oil pump P. The flow regulating valve 90 comprises a valve member 92 housed in a casing 91, and a coil spring 96 disposed under compression between the valve member 92 and a valve seat 95 secured in the casing 91 by a pin 95. The valve member 92 which has an axial through hole 93 is normally urged by the coil spring 96 to move in a direction opposite to the direction in which oil flows through the flow regulating valve 90.

When the oil pressure discharged from the oil pump P is low in an idling speed range of the engine 1, the valve member 92 is biased under the force of the coil spring 96 to open a circulating passage 97 to circulate oil to the inlet of the oil pump P. As the oil pressure from the oil pump P increases in response to an increase in the engine speed, the valve member 92 closes the circulating passage 92 against the bias of the coil spring 96, feeding the oil from the feed hose H2 to the actuator 130. In a higher engine speed range in which the oil pressure from the pump is excessively high, the valve member 92 is moved further against the bias of the coil spring 96 to open the circulating passage 97 again to circulate the oil to back to the inlet of the oil pump P.

When the oil pressure in the actuator 130 becomes higher than a predetermined level, a relief valve 98 is opened to introduce the oil from a return passage 99 into the circulating passage 97.

The flow rate control unit 80 for reducing kickback is disposed in the supply passage 51 in the valve body 31 of the actuator 130.

As illustrated in FIG. 20, the flow rate control unit 80 comprises the joint 138 fixedly fitted in the upper larger-diameter portion 81 of the supply passage 51, and the hollow one-way valve 82 vertically slidably fitted in the lower portion of the joint 138.

FIG. 20 shows normal operation of the power steering apparatus 100 at the time the motor vehicle runs straight ahead with the handlebar 7 not turned. As indicated by the arrows, working oil flowing from the oil pump P through the one-way valve 82 into the valve hole 32 is divided from the recess 61 through the oil passages 52, 53 into the recesses 62, 63, from which the working oil is delivered directly and through the oil passage 64 into the return passage 59. The working oil then flows through the return passage 59 back to the oil reservoir tank T. The check valve 37 in the spool valve 33 allows oil to flow only from the return passage 59 into the supply passage 51. The check valve 37 allows oil to circulate in the actuator 130 when the pump P is stopped.

Figure 21:
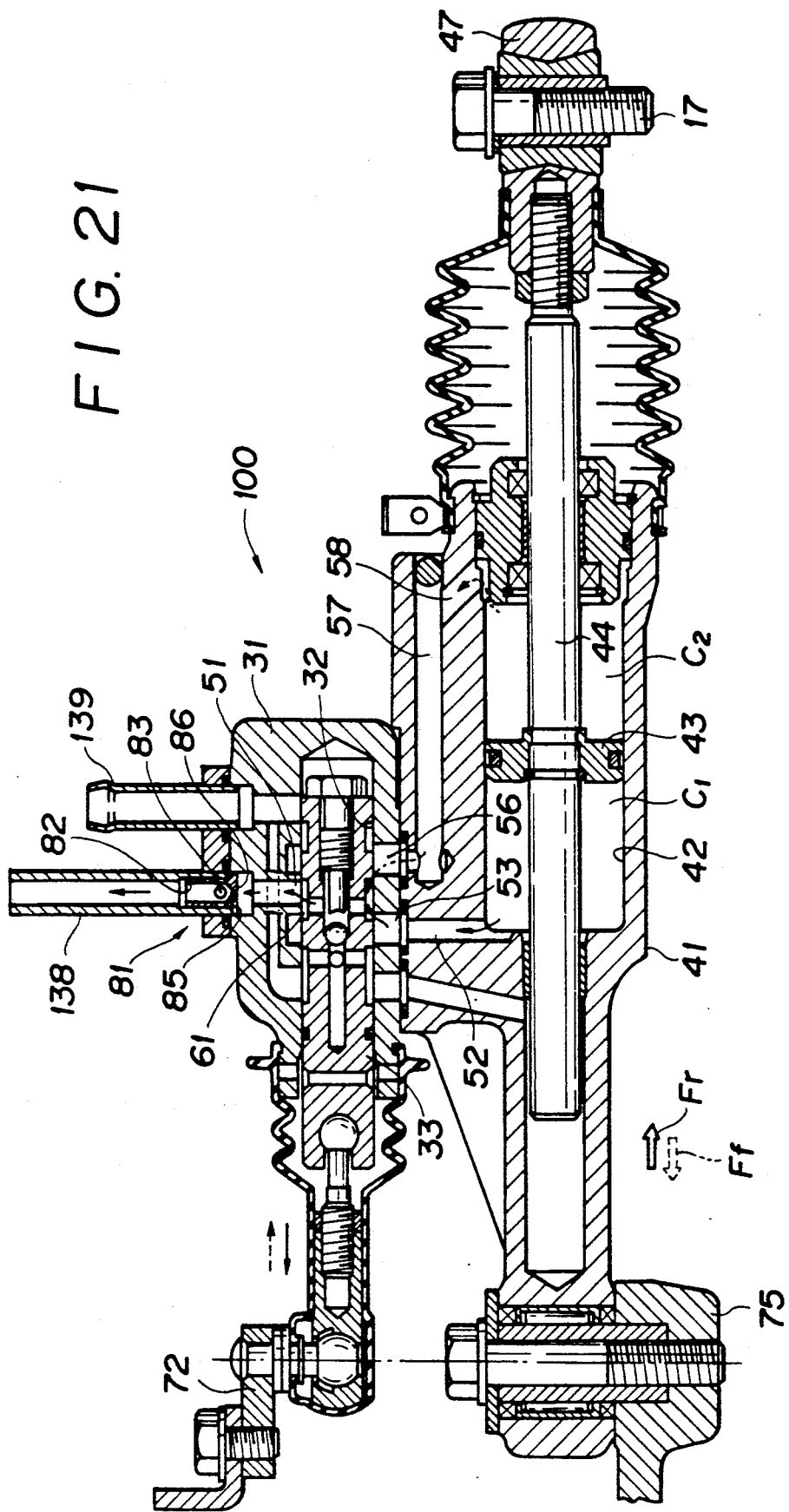
FIG. 21 is a view similar to FIG. 20, showing the steering damper device at the time a kickback is produced with the steering handle not turned.

When a reactive force from the road is applied which tends to urge the wheels 2 to be steered to the right while the motor vehicle is running straight ahead, the cylinder body 41 is urged by the central arm 75 to move rearwardly as indicated by the arrow Fr in FIG. 21. Since the piston 43 is fixed with respect to the vehicle frame, oil in the front fluid chamber C1 in the cylinder 42 is put under compression. As indicated by the solid-line arrows in FIG. 21, the oil under compression flows through the oil passages 52, 53 and the recess 61 into the oil passage 51. The oil flow moves the one-way valve 82 up to its upper limit position, in which the holes 83 and the recess 85 are closed by the joint 138. Therefore, the oil flows only through the orifice 86 into the hose H2. The oil flow is restricted by the orifice 86 to produce a damping force which limits relative movement of the cylinder 42 and the piston 43. Therefore, any kickback applied from the road to the handlebar 7 is reduced.

When a reactive force from the road is applied which tends to urge the wheels 2 to be steered to the left while the motor vehicle is running straight ahead, the cylinder body 41 is displaced by the central arm 75 forwardly as indicated by the arrow Ff in FIG. 21. Since the piston 43 is fixed with respect to the vehicle frame, oil in the rear fluid chamber C2 in the cylinder 42 is placed under compression. The oil under compression flows through the oil passages 58, 57, 56 and the recess 61 into the oil passage 51. The oil flow moves the one-way valve 82 up to its upper limit position. Therefore, the oil flows only through the orifice 86 into the communication passage 50. The oil flow is restricted by the orifice 86 to produce a damping force which limits relative movement of the cylinder 42 and the piston 43. Therefore, any kickback applied from the road to the handlebar 7 is reduced, as with the mode of operation shown in FIG. 13.

When the handlebar 7 is turned to the right from the position of FIG. 20, the spool valve 33 is moved rearwardly with a phase difference with the valve body 31 and the cylinder body 41. Such rearward movement of the valve 33 with respect to the valve body 31 causes the oil to flow as indicated by the arrows in FIG. 22. More specifically, the oil first flows through the supply passage 51, the recess 61, the oil passages 56, 57, 58 into the rear fluid chamber C2 in the cylinder 42. The oil in the front fluid chamber C1 flows from the oil passages 52, 53 into the recess 63, and the oil in the rod hole 45 flows from the oil passages 54, 55 into the recess 63. The oil delivered into the recess 63 then flows from the oil passage 64 into the return passage 59, and finally returns to the oil reservoir tank T.

The piston 43 relatively moves forwardly in the cylinder 42 under the pressure of the oil fed into the rear fluid chamber C2 in the cylinder 42. Inasmuch as the piston rod 44 is fixed to the vehicle frame through the rod end 47, the cylinder body 41 moves rearwardly in reality. The rearward movement of the cylinder body 41 causes the central arm 75 pivoted to the front portion of the cylinder body 41 to apply a rightward assistive steering force to the steering shaft end 25. The steering force required to be applied to the handle bar 7 is reduced when the shaft end 25 is turned under the oil pressure.

When the steering force applied from the handlebar 7 is large enough to turn the inner shaft 22 in excess of the gap c, the steering force is applied directly from the splines 27 to the shaft end 25. This holds true for a mode of operation shown in FIG. 23.

When the handlebar 7 is turned to the left from the position of FIG. 20, the spool valve 33 is moved forwardly with a phase difference with the valve body 31 and the cylinder body 41. Such forward movement of the valve 33 with respect to the valve body 31 causes the oil to flow as indicated by the arrows in FIG. 23. More specifically, the oil first flows through the supply passage 51, the recess 61, the oil passages 53, 52 into the front fluid chamber C1 in the cylinder 42. The oil in the rear fluid chamber C2 flows from the oil passages 58, 57, 56 into the recess 62, from which the oil flows through the return passage 59, the oil passage 64, the recess 63, and the oil passages 55, 54 into the rod hole 45.

The piston 43 relatively moves rearwardly in the cylinder 42 under the pressure of the oil fed into the front fluid chamber C1 in the cylinder 42. Inasmuch as the piston rod 44 is fixed to the vehicle frame through the rod end 47, the cylinder body 41 moves forwardly in reality. The forward movement of the cylinder body 41 causes the central arm 75 pivoted to the front portion of the cylinder body 41 to apply a leftward assistive steering force to the steering shaft end 25. The steering force required to be applied to the handle bar 7 is reduced when the shaft end 25 is turned under the oil pressure.

Figure 22:
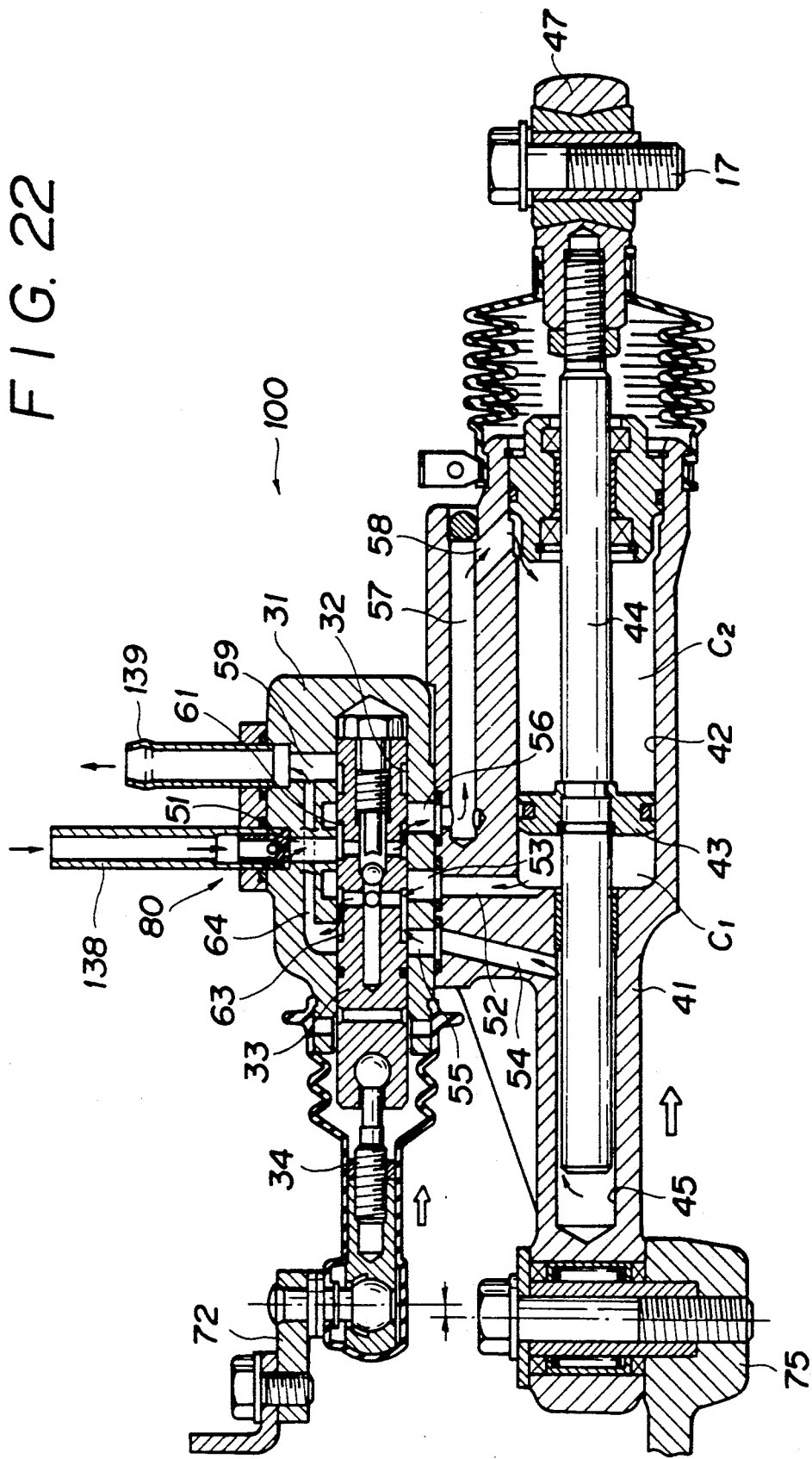
FIG. 22 is a view similar to FIG. 20, showing the steering damper device at the time the steering handle is turned to the right.
Figure 23:
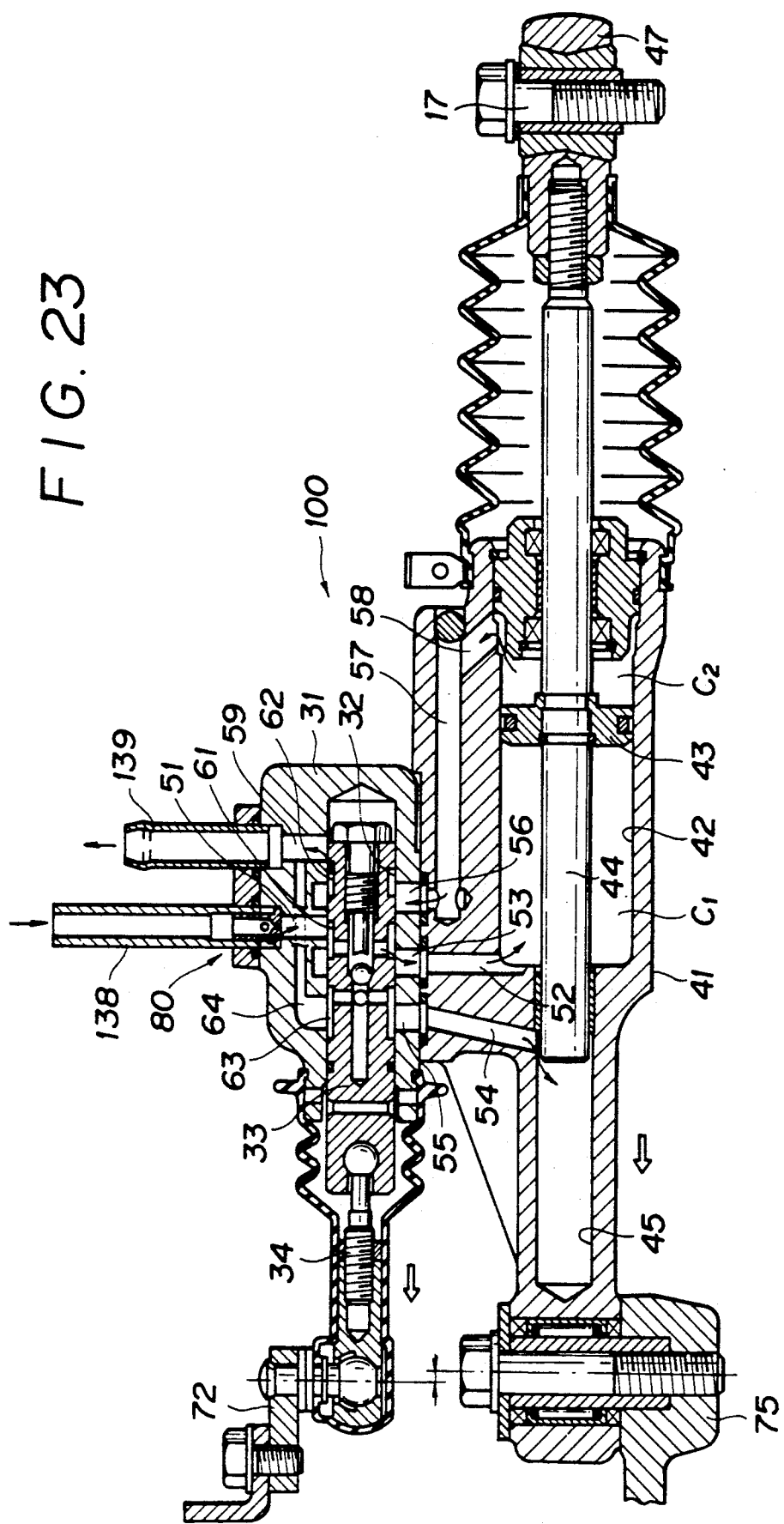
FIG. 23 is a view similar to FIG. 20, showing the steering damper device at the time the steering handle is turned to the left.

When a reactive force from the road is applied to the wheels 2 while the handlebar 7 is being turned as shown in FIGS. 22 and 23, the one-way valve 82 of the flow rate control unit 80 is moved upwardly, thus producing a damping force which reduces any kickback from the road.

The supply passage 51 which supplies oil under pressure from the oil pump P has the flow rate control unit 80 which includes the restriction function provided by the orifice 86 that restricts only the oil flow from the supply passage 51 to the oil pump P. The flow rate control unit 80 generates a damping force only when the direction in which the handlebar 7 is turned and the direction in which the wheels 2 are steered are not the same as each other, regardless of how the handlebar 7 is turned. It is considered that when the handlebar 7 is in its neutral position, the direction in which the handlebar 7 is turned and the direction in which the wheels 2 are steered are not the same as each other, regardless of in which direction a reactive force from the road is applied to the wheels 2. Consequently, when the fluid flows from the control valve assembly V back to the oil pump P due to a reactive force imposed by the road on the wheels 2, a damping force is reliably produced by the restriction function of the flow rate control unit 80. As a consequence, a kickback on the handlebar 7 is reliably minimized.

The oil pump P is not required to be a high-pressure pump, and it is not necessary to increase the accuracy of the hydraulic pressure control circuit to a substantially high level. The friction developed in the hydraulic pressure control circuit against the fluid flowing therethrough is therefore reduced, so that the service life of the power steering apparatus 100 is increased and the cost thereof is lowered.

The hydraulically operated power steering apparatus 100 can be incorporated in general commercially available motor vehicles simply by replacing their steering systems.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. In a steering damper device for a motor vehicle having a vehicle frame, a steering handle, a steering shaft supporting the steering handle, at least one road wheel, and an output member operatively coupled to the steering shaft for transmitting a steering action of the steering handle to the road wheel, the improvement wherein said steering damper device comprises:
   a first detecting mechanism operatively coupled to the steering shaft for detecting a direction in which the steering shaft is turned;
   a second detecting mechanism operatively coupled to the output member for detecting a direction in which the road wheel is steered; and
   a damping force generating mechanism operatively coupled to said first detecting mechanism, said second detecting mechanism, and said output member, said damping force generating mechanism having means for imposing a damping force on said output member so that a kickback acting on the steering handle can be reduced when said second detecting mechanism detects that said direction in which the road wheel is steered becomes instantaneously opposite to the direction in which the steering handle is turned, due to a reactive force applied from a road to the road wheel,
   said first detecting mechanism comprising a first movable member connected to the steering shaft and movable therewith;
   said second detecting mechanism comprising a second movable member connected to said output member and movable therewith;
   said damping force generating mechanism comprising:
      a housing integrally attached to said second movable member and having a chamber defined therein;
      a stationary member fixed to the vehicle frame and dividing said chamber in the housing into two fluid chambers;
      fluid passages at least partly defined in said housing and providing fluid communication between said fluid chambers;
      a control valve coupled to said first movable member and disposed in said housing, said control valve selectively controlling said fluid passages so as to allow a fluid to flow in a predetermined direction through one of said fluid passages as long as said second movable member moves in the same direction as the direction in which said first movable member moves; and
      a one-way valve disposed in said one fluid passage and developing a resistance to the fluid flow only when the fluid tends to flow in a direction opposite to said predetermined direction at the time said second movable member instantaneously moves in a direction opposite to the direction in which said first movable member moves.

2. A steering damper device according to claim 1, wherein the motor vehicle further includes a hydraulically operated steering power assisting apparatus having a power source and a pump actuatable by the power source for supplying a fluid under pressure;
   said pump being connected through said fluid passages to said housing such that the fluid supplied under pressure from said pump is supplied to one of said fluid chambers through said one of the fluid passages in which said one-way valve is disposed; and said control valve selectively controlling said fluid passages so as to urge said second movable member through said housing to move in said same direction as the direction in which said first movable member moves, by supplying the fluid under pressure through said one-way valve to said one of the fluid chambers.

3. A steering damper device according to claim 1 wherein said motor vehicle comprises a riding type motor vehicle.

4. A steering damper device according to claim 1 wherein said output member is coaxial with said steering shaft.

5. A steering damper device according to claim 1 wherein said output member is resiliently connected to said steering shaft.

* * * * *